(No Model.)
J. B. DUNLOP.
WHEEL FOR VELOCIPEDES.
No. 479,255.  Patented July 19, 1892.
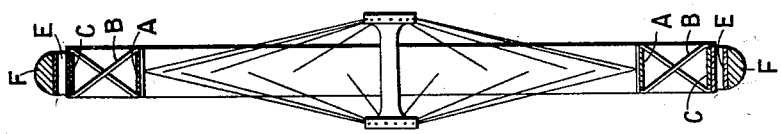
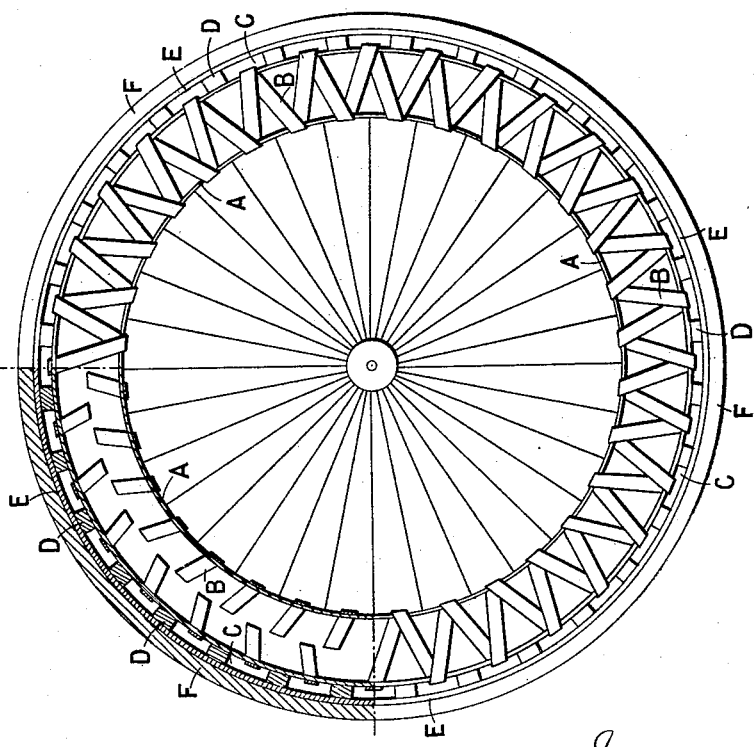

UNITED STATES PATENT OFFICE.

JOHN BOYD DUNLOP, OF BELFAST, IRELAND.

WHEEL FOR VELOCIPEDES.

SPECIFICATION forming part of Letters Patent No. 479,255, dated July 19, 1892.

Application filed February 10, 1892. Serial No. 421,012. (No model.)

*To all whom it may concern:*

Be it known that I, JOHN BOYD DUNLOP, veterinary surgeon, a subject of the Queen of Great Britain, and a resident of Belfast, in the county of Antrim, Ireland, have invented certain new and useful Improvements in and Relating to Wheels for Velocipedes and other Vehicles, of which the following is a specification, reference being had to the accompanying drawings.

My invention relates to wheels for velocipedes and other vehicles, and is designed to render the wheels more elastic and to preserve the rider or occupants of the vehicle from the shocks and jars which any unevenness or roughness of the road occasions when ordinary rigid wheels are used.

An important object of my invention is the production of a wheel having a flexible yet durable and securely-fastened periphery which shall at the same time possess considerable lateral stability or rigidity.

According to my invention I apply to the ordinary wheels of velocipedes and other vehicles one or more elastic or flexible rings constructed of flat bars of steel, wood, vulcanite, or other suitable material. The said ring or rings is or are placed outside the rigid rim of the wheel concentric therewith and in the same plane. I connect the said ring or rings to the rigid rim by pliable bands of linen cloth or the like, as is hereinafter more particularly described. The rigid rim is broader and flatter than would be the case if an ordinary tire was to be fitted to it. When I use more than one ring, I make the same of different diameters. The rigid rim of the wheel and also the ring or rings are coated with suitable cement and covered with cloth or other suitable fabric, the same being again covered with india-rubber solution or other suitable cement before or after being applied to the rim or to the ring or rings.

In the accompanying drawings, Figure 1 is a side elevation of a wheel made according to my invention. Fig. 2 is a vertical section of the same.

Similar letters of reference denote corresponding parts in both drawings.

A is the rigid rim of an ordinary wheel, and C is the innermost flexible ring or hoop. Both these are covered with cloth cemented, as above mentioned. The ring C is secured to the wheel by means of one or more strips or bands B, made of linen, cloth, tape or cord, or other flexible or pliable but comparatively non-elastic material. The said bands or cords B are coated with india-rubber or the like and are passed over on the inner surface of the rim A and on the outer surface of the rings C and crossed between said rim and ring after the form of the letter X, as shown in Fig. 2. The said bands are thereby firmly secured to the opposite edges of the rim A and ring C. The coating of india-rubber on the bands B serves as cement to unite the said bands to the covered rim and ring, and, moreover, protects the said bands from wear and moisture. The bands B may be fastened to the edges of the said rim and ring by means of lacing, wrapping, or stitching, but are preferably secured as above described.

When I employ more than one ring outside the ordinary rim of the wheel, as shown at E, I secure the said covered rings firmly together by means of a layer or pieces D, of india-rubber or other elastic material, cemented in position between the said covered rings with india-rubber solution or other cement. I may, if desired, secure the said rings more firmly to each other with strips of cloth or the like covered with cement. The innermost ring or rings may be corrugated or waved; but I prefer to construct them of a regular circular form, as shown.

In place of employing two or more rings, I sometimes use a continuous bar or strip of steel or other material bent round and overlapping somewhat in the form of a watch-spring or child's wooden hoop, the several turns or layers of the said bar being secured to each other by cloth and india-rubber in a fashion similar to that above described for the two separate rings or hoops.

During the operation of securing the rim A of the wheel to the innermost ring C the wheel and said ring may be placed on a suitable support and be held in position by pieces of wood or wire props of a suitable length or clamps. The bands or strips B, which secure the innermost ring to the rim, are drawn so tight as to maintain the ring in position without preventing the same from bending when a weight is applied to the wheel or vehicle.

On the outermost ring I secure with cement or otherwise an india-rubber or other elastic tire F, which may be solid, hollow, or cellular in order to still further damp the vibration due to any roughness of the road.

The spring or resiliency of the wheel being principally dependent on the ring or rings, it is important that the same should be well secured to the rim and to each other without requiring to have holes formed therein for bolts or rivets.

It is well known that cloth cannot be securely fastened to steel or wood by means of cement alone unless the cloth be wrapped firmly round the steel or wood as I have described, and it is difficult to cement or secure india-rubber directly to flexible steel or wood unless some process of vulcanization is made use of. In order to obtain lateral stability in the wheel, it is important that the bands B should cross each other, as shown, and be securely fastened to the edges of the rim A and rings C, as described, and not merely applied or cemented to the adjacent surfaces of the said rim and ring.

When I use two or more rings, they practically form one flexible rim or periphery, both or all acting and bending together, preferably being only slightly separated by india-rubber for the purpose of permitting free flexure and preventing friction between the surfaces of the several rings. My object in using more than one ring is to increase the flexibility of the periphery without unduly weakening the same, in order to give increased comfort and ease to the rider or occupant.

The india-rubber which I place between the aforesaid rings being firmly adherent to the surfaces or covered surfaces of said rings is for the purposes of securing said rings to one another and preventing friction, as well as reducing the jar in some slight degree.

I claim—

1. In a wheel for velocipedes or other vehicles, the combination, with a rigid rim, of a flexible or elastic covered ring or hoop larger than and concentric with the said rim and bands of cloth or other pliable and non-elastic textile material connecting the said rim with the elastic ring, substantially as and for the purpose specified.

2. In a wheel for a velocipede or other vehicle, the combination, with a rigid rim, of flexible rings or hoops larger than and concentric with the said rim, said rings or hoops being firmly secured together by blocks of india-rubber interposed between and cemented to them, and bands or strips of pliable cloth connecting the said rings to the rigid rim, substantially as described.

3. In a wheel for velocipedes or other vehicles, the combination, with a rigid rim, of a covered flexible compound ring made up of a series of convolutions larger than and concentric with the said rim and bands or strips of cloth or other pliable material connecting the said compound ring to the rigid rim, substantially as described.

In testimony whereof I have hereunto signed my name in the presence of two subscribing witnesses.

JOHN BOYD DUNLOP.

Witnesses:
   JOHN G. SHAW,
      *Notary Public, Belfast.*
   WM. ROSS,
      *Law Clerk, Belfast.*